United States Patent [19]

Gibson

[11] Patent Number: 5,892,793
[45] Date of Patent: Apr. 6, 1999

[54] SPREAD SPECTRUM SIGNALLING SCHEMES

[75] Inventor: Rodney W. Gibson, Haywards Heath, England

[73] Assignee: U.S. Philips Corporation, New York, N.Y.

[21] Appl. No.: 558,061

[22] Filed: Nov. 10, 1995

[30] Foreign Application Priority Data

Nov. 18, 1994 [GB] United Kingdom .................... 9423328

[51] Int. Cl.⁶ ...................................... H04K 1/00
[52] U.S. Cl. ........................................... 375/208; 375/340
[58] Field of Search ..................... 375/200, 303, 375/206, 208, 340, 358, 367; 340/825; 455/507

[56] References Cited

U.S. PATENT DOCUMENTS 4,882,579  11/1989  Siwiak .............................. 340/825.44
5,430,759  7/1995   Yokev et al. ........................ 375/202

FOREIGN PATENT DOCUMENTS 9506364  3/1995  WIPO .

OTHER PUBLICATIONS

"Advanced Paging Operators Code Paging Code Specification", Philips Telecom—Private Mobile Radio 1993, Issue 2.0, Jun. 1, 1995, pp. 1–27.
"The Book of The CCIR Radiopaging Code No. 1", Radiopaging Code Standards Group, pp. 38–40.
Berbard Sklar "Digital communications Fundamentals and Applications," Prentice Hall, 1988, pp. 555–570.

Primary Examiner—Tesfaldet Bocure
Attorney, Agent, or Firm—Jack D. Slobod

[57] ABSTRACT

A communications system including a primary station and at least one or more secondary stations. The secondary station transmits signals as spread spectrum signals and a receiver in the primary station receives and decodes the spread signals. Frequency offsets in the received spread spectrum signals are dealt with by digitizing the received signals to produce raw data samples which are despread, frequency analyzed and the spectrums derived are scanned for peaks exceeding a predetermined threshold and the outputs indicate the presence or absence of codes.

7 Claims, 4 Drawing Sheets

SPREAD SPECTRUM SIGNALLING SCHEMES

BACKGROUND OF THE INVENTION

The present invention relates to improvements in or relating to spread spectrum signalling schemes and has particular but not exclusive application to the transmission of low power spread spectrum signals from low power transmitters which may be included in message receiving apparatus such as selective call receivers, for example digital pagers or hand held digital signal processing apparatus.

U.S. Pat. No. 4,882,579 discloses an acknowledge back (ack-back) paging system in which a central station transmits a sequence of addresses of a group of M different ack-back pagers for whom there are paging signals and after an interval this is followed by a sequence of messages to the group of ack-back pagers. The order of the messages is related to the order of the addresses in the transmitted sequence in a predetermined manner. The users of the group of addressed ack-back pagers indicate a response, for example by pressing a button, to their respective pagers thus providing ack-back data. The pagers in the group of addressed ack-back pagers then simultaneously transmit back to the central station their ack-back signals using different pseudo-random codes, a different pseudo-random code being allocated to each of the pagers in the group. In order to permit simultaneous transmissions the pagers must send the transmitted acknowledgement signal with extreme accuracy in frequency. In order to facilitate accurate frequency tuning the central station transmits a burst of reference carrier in a time interval between the transmissions of the sequence of addresses and the sequence of messages and the pagers have to include frequency control circuitry which permits such accuracy in frequency tuning. Additionally power control techniques are applied by the pagers to regulate transmitter output power.

OBJECTS AND SUMMARY OF THE INVENTION

An object of the present invention is to facilitate distinguishing between different simultaneously transmitted spread spectrum signals in a manner which does not affect the overall rate of message throughput and involve additional complication of the selective call receiver.

According to a first aspect of the present invention there is provided a communications system comprising a primary station having transmitting and receiving means, means for formatting messages to be transmitted by the transmitting means, and one or more secondary stations, the or each secondary station having receiving means for receiving messages from the primary station and means for transmitting signals as spread spectrum signals, said receiving means in the primary station being adapted to receive and decode the or each of the spread spectrum signals, said primary station further comprising means for frequency analysing either an unspread part of the signal as received or the spread spectrum signal after despreading.

According to a second aspect of the present invention there is provided a primary station for use in the communications system in accordance with the first aspect of the present invention, the primary station comprising transmitting and receiving means, means for formatting messages to be transmitted by the transmitting means, said receiving means being adapted to receive and decode the or each of a plurality of spread signals, said primary station further comprising means for frequency analysing either an unspread part of the signal as received or the spread spectrum signal after despreading.

According to a third aspect of the present invention there is provided a method of distinguishing between each of a plurality of substantially simultaneously occurring different spread spectrum signals which may include frequency offsets, comprising frequency analysing either an unspread part of the signal as received or the spread spectrum signal after despreading.

By means of the present invention it is possible to recover the or each of a plurality of simultaneously transmitted spread spectrum signals without having to transmit bursts of reference carder and having to provide frequency control circuits in the selective call receivers. Furthermore the present invention enables the effects of Doppler shift to be taken into account without any special measures having to be adopted.

In a first embodiment a digitised version of the received signal is despread using each of the codes which may have been used and each time the raw data is frequency analysed and the resulting spectrum is examined to see if there is a peak indicating that the code used for despreading was correct.

In a second embodiment a burst of carrier precedes the spread spectrum signal and at the primary station the received signal is analysed to see what frequencies are present and each frequency is used to de-rotate the received signal and after each de-rotation a check is made for the presence of any one of the spreading codes.

BRIEF DESCRIPTION OF THE DRAWINGS

The present invention will now be described, by way of example, with reference to the accompanying drawings, wherein.

In the drawings the same reference numerals have been used to indicate corresponding features.

DETAILED DESCRIPTION OF THE PREFERRED EMBODIMENT

Figure 1:
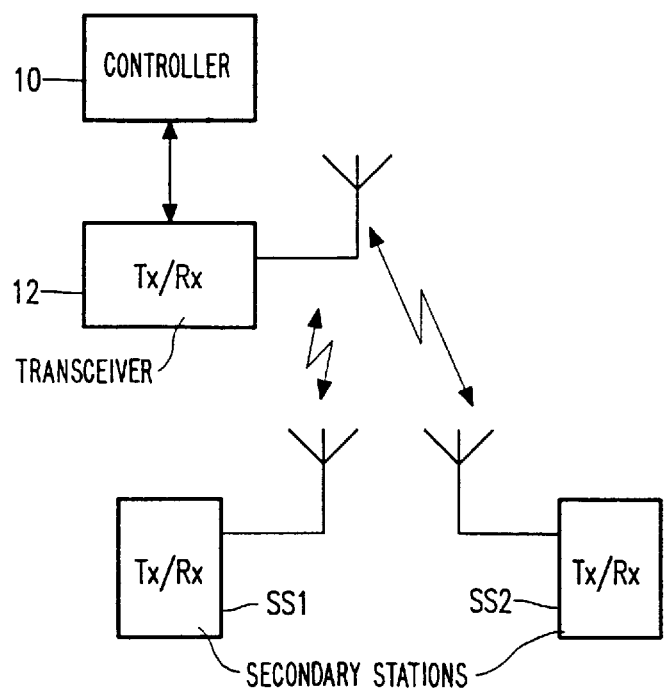
FIG. 1 is a diagram illustrating a message transmission system for transmitting data messages.

The system shown in FIG. 1 may comprise a system for transmitting relatively long data messages such as telescript or E-mail or a paging system. For convenience of description the present invention will be described with reference to a high rate paging system operating in accordance with a protocol known by the Applicant as the Advanced Paging Operators Code (APOC), which has provision for sending address code words and concatenated message code words in cycles having a duration of 6.8 secs. Each cycle comprises a plurality of batches, for example 3 batches of equal duration. Each batch comprises a synchronisation (sync) code word concatenated with n frames, each of which is constituted by m code words.

The paging system comprises a paging system controller 10 which is connected to at least one base station transceiver 12, if necessary by land lines or other suitable links. In the event of there being more than one base station transceiver they may be geographically spaced apart and may operate in a quasi-synchronous mode.

Selective call receivers or secondary stations SS1,SS2 are provided, each of which comprises a transceiver which is able to receive transmissions from the transceiver 12 and is able to transmit a limited number of types of messages, including acknowledgements, at significantly lower power than the output power of the transceiver 12, for example 30 dB lower. The messages are transmitted as spread spectrum signals typically at an information rate of one thousandth of that transmitted by the transceiver 12 and a spreading sequence length of the order of $10^4$, for example 8191 chips per bit.

In one embodiment of the system, the paging system controller 10 attempts to overcome the near/far problem without resorting to transmitter power control in the secondary stations by transmitting a set of invitation signals at a plurality of different power levels ranging between predetermined lower and upper limits, for example progressively increasing power levels, and secondary stations receiving the invitation signals respond to the invitation signal having the lower or lowest power and having responded do not reply to higher powered invitations in the same set which will be received by more distant secondary stations. The advantage of staggering the power levels of the invitation signals is that the strength of the replies at any one instant will be comparable thereby mitigating against the near/far problem instead of the conventional method of applying power control to transmitters.

Figure 2:
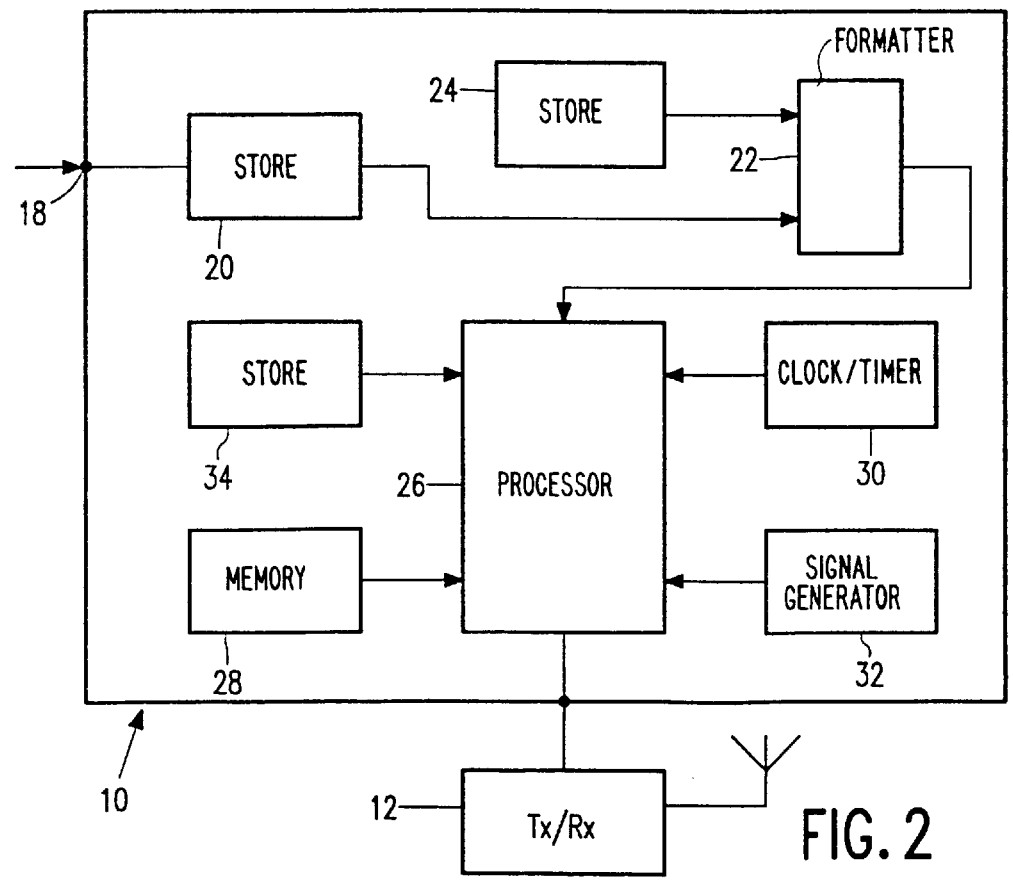
FIG. 2 is a block schematic diagram of a primary station comprising a system controller and a base station transceiver.

FIG. 2 shows an arrangement of a system controller 10 connected to the transceiver 12 which transmits a sequence of invitation signals at different power levels. The system controller 10 comprises an input 18 for data messages to be relayed via the transceiver 12. The messages are held in a store 20 from where they are relayed to a formatting stage 22 which appends an address code word to the message and divides the message into a plurality of concatenated code words of a pre-determined length, each code word including error detection/correction bits and optionally an even parity bit. The address code words are held in a store 24. A processor 26 is provided which controls the operation of the system controller in accordance with a program which is stored in a memory 28. Also connected to the processor 26 are a clock/timer stage 30, an invitation signal generator 32 and a store 34 for storing details of the code sequences which may be used by the secondary stations in transmitting their responses to the invitation messages. Once the data messages in the store 20 have been formatted in the stage 22 the processor 26 causes them to be relayed by the base station transceiver 12. The formatting of the data messages may conform to any known message format such as APOC, CCIR Radiopaging Code No 1 (otherwise known as POCSAG) or to any other signal format which is known or yet to be devised. Once the messages have been transmitted, the processor arranges to transmit the invitation-to-respond signals generated in the stage 32. In one mode, after each transmission of an invitation signal at a progressively increasing power level, a time interval is provided in which a secondary station may respond. Once the time interval has elapsed then the invitation signal is repeated at increased power levels up to a maximum power level, each invitation being followed by a time period for reply.

The processor 26, following the transmission of an invitation signal, switches the transceiver 12 to receive and is ready to accept signals received by the transceiver 12, the outbound propagation path to the or each secondary station being substantially the same as that of the inbound propagation path. In order to identify, each of the responses which is sent as a spread spectrum signal, each of the code sequences is mixed sequentially with the received signals which are held in a buffer and when a correlation is obtained then the response is noted and further code sequences are mixed with the received signal in order to recover any other responses which may be present.

In another mode, the respective invitation signals are transmitted successively and a plurality of time slots are provided for receiving responses as spread spectrum signals, there being one time slot per power level. Optionally the response sequences may be divided into sub-sequences and the sub-sequences interleaved over a plurality of time slots in order to overcome the effects of any short term fading.

In a variant of the last mentioned mode, a plurality of sets of invitation signals are transmitted and a secondary station transmits a response to the lowest powered invitation signal received at a suitable moment following the transmission of the last set of invitation signals.

As a response lasts for substantially a second if it is transmitted in a single burst; this is long compared with typical fade rates. Thus if a secondary station is in a deep fade when it chooses its slot it may produce a signal at the receiver 20 dB above the planned strength for the slot. Since a fading signal often falls well below its average, but only goes about 3 dB stronger, it may be better to use a measure of the average signal strength in order to choose the slot. An indirect measure of the signal strength which avoids the need for dedicated circuitry is to deduce the average signal strength from the ordinals of the invitation signals received in the concatenated sets. However, it is necessary to optimise the time over which the average is determined because if too long is taken the average may be out of date when the response is transmitted.

Another effect of signal strength variation may be on the false rate. If the signal varies it will alter the correlations. For this reason it is necessary to choose codes having good short-term balance of ones and zeroes in the products. Thus fades will affect a roughly equal number of ones and zeroes.

Figure 3:
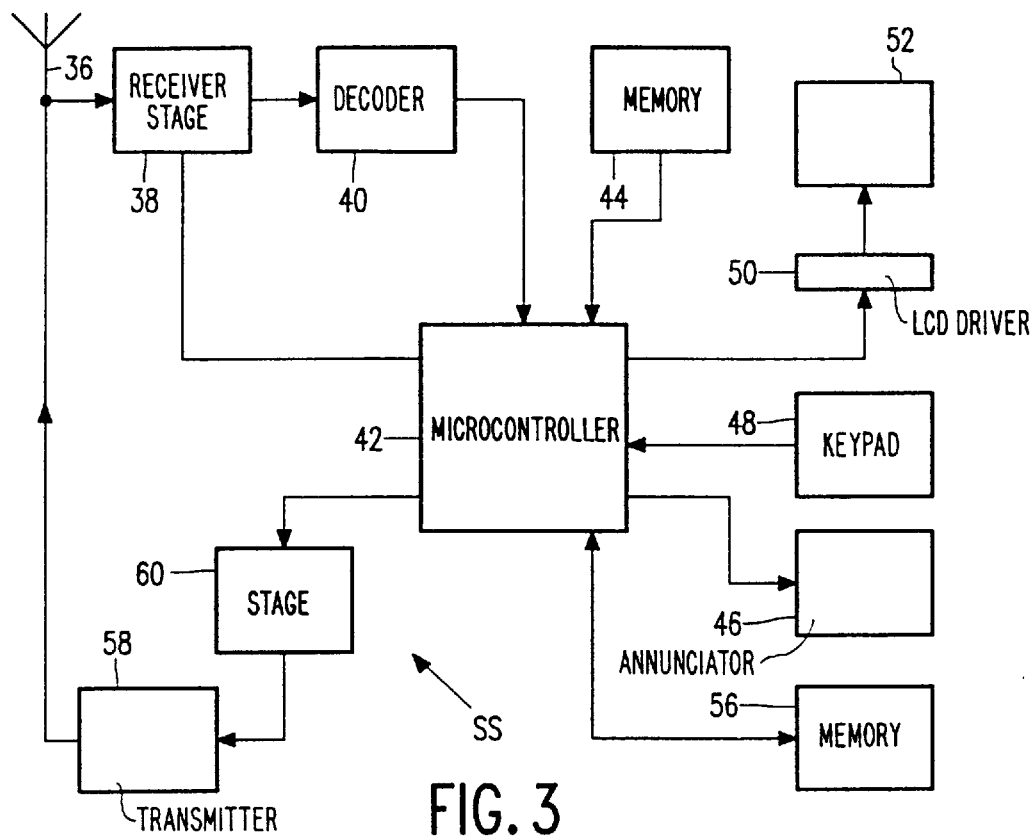
FIG. 3 is a block schematic diagram of a secondary station.

FIG. 3 is a block schematic diagram of a secondary station SS having the capability of transmitting responses to invitation signals as spread spectrum signals. The secondary station SS comprises an antenna 36 which is coupled to a receiver stage 38. An output of the receiver stage 38 is coupled to an input of a decoder 40. A microcontroller 42 is coupled to the output of the decoder 40 and controls the operation of the secondary station in accordance with a program held in a read only memory (ROM) 44. The microcontroller 42 has inputs/outputs, as appropriate, coupled to annunciating means 46 which may be audio, visual and/or tactile, a keypad 48, data output means, for example an LCD driver 50 which is coupled to an LCD panel 52, and a random access memory (RAM) 56 for storing any messages which have been received and decoded.

In operation the receiver stage 38 is energised in response to the particular battery economising protocol followed by the secondary station SS. Optionally the decoder 40 and the microcontroller 42 may "sleep" when not required, the microcontroller 42 being woken by an internal timer (not shown) or an interrupt signal and in so doing waking up other stages of the secondary station, as appropriate. When an address code word is received, it is demodulated, decoded, error corrected and checked to see if it is one assigned to the secondary station or an invitation to send a message to the primary station. Assuming it is an address code word assigned to the secondary station then depending on the programming of the microcontroller 42, the annunciating means 46 may be activated to inform the user that a call has been received. However a user by actuating a key or keys of the keypad 48 can inhibit one or more of the output devices of the annunciating means. If a short message at the same data rate as the address code word is concatenated with the paging call then once it has been decoded and error checked/corrected, the microcontroller 42 causes the decoded message to be stored in the RAM 56. By actuating a key or keys of the keypad 48, a user can instruct the microcontroller 42 to read-out the message from the RAM 56 to the LCD driver 50 which will cause the message to be displayed on the screen 52. The operation described so far is typical for many alphanumeric message pagers conforming to the POCSAG standard.

The illustrated secondary station SS includes a low power transmitter 58 whereby acknowledgements and/or short messages can be relayed to the or any in-range base station transceiver. The actual acknowledgement or message is generated by the microcontroller 42 and will be transmitted as a spread spectrum signal. One or more near orthogonal pseudo-random code sequences may be stored or generated in a stage 60. The microcontroller 42 controls the reading out of a code sequence from the stage 60 which is coupled to a transmitter 58. The code sequence may be one of a set of near orthogonal sequences or a time shifted version of such a sequence. The chosen sequence may represent the identity of the secondary station and/or the number of a message received and/or coded reply as shown below.

Code Sequence 1—secondary station in the area for the purposes of registration only.
Code Sequence 2—Received last message.
Code Sequence 3—Read message(s).
Code Sequence 4—Answer "Yes".
Code Sequence 5—Answer "No".
Code Sequence 6—Resend last message.

As an alternative to allocating sets of predetermined code sequences to secondary stations allocated to respective frames, the paging system controller and the secondary stations may each store the same block of code sequences, say 1000 code sequences. When a data message is to be transmitted to an addressed secondary station the system controller anticipates that one of say 20 possible answers may be possible and the overall transmission of the data message includes an indication that twenty of the 1000 possible code sequences have been allocated dynamically to the secondary station for use in transmitting its answer, each code sequence representing one of twenty possible answers. Once a response to an invitation signal has been received and relayed to the system controller it is compared with each of the twenty dynamically allocated code sequences and the code sequence which achieves the best correlation is deemed to give the answer to the message. Once the answer has been determined the allocation of the twenty code sequences for an answer from that secondary station is withdrawn, either explicitly or implicitly.

In a practical situation strings of messages are transmitted sequentially to different secondary stations and in those cases where answers are required, the number of possible answers may vary,consequently the number of code sequences from the batch of, say 1000, possible code sequences allocated by the system controller for an answer from a particular secondary station will vary accordingly. However as stated above the allocation is temporary.

Figure 4:
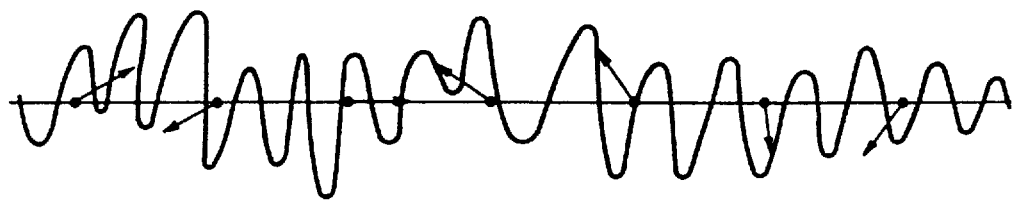
FIG. 4 is a diagram illustrating a raw signal plotted against time, t.

The description so far has not taken account of the fact that the spread spectrum signals may be affected by frequency offsets and Doppler shifts causing the phase of the received spread spectrum signal to vary in a semi-random way at, say, the Doppler rate. This is illustrated in FIG. 4 which shows a raw signal consisting of a binary phase code signal denoted by the arrows, subject to phase variations, in noise. The effect of these phase variations is to cause the signal to integrate to an arbitrary value depending on the phase value rendering the output of the normal correlation detector useless.

Overcoming frequency offsets in the selective call receiver by constraining the transmitter to say a 10 Hz frequency (as opposed to a typical carrier frequency tolerance of 3 to 5 ppm) would be prohibitively expensive and render the selective call receiver too expensive.

Figure 6:
Figure 5:
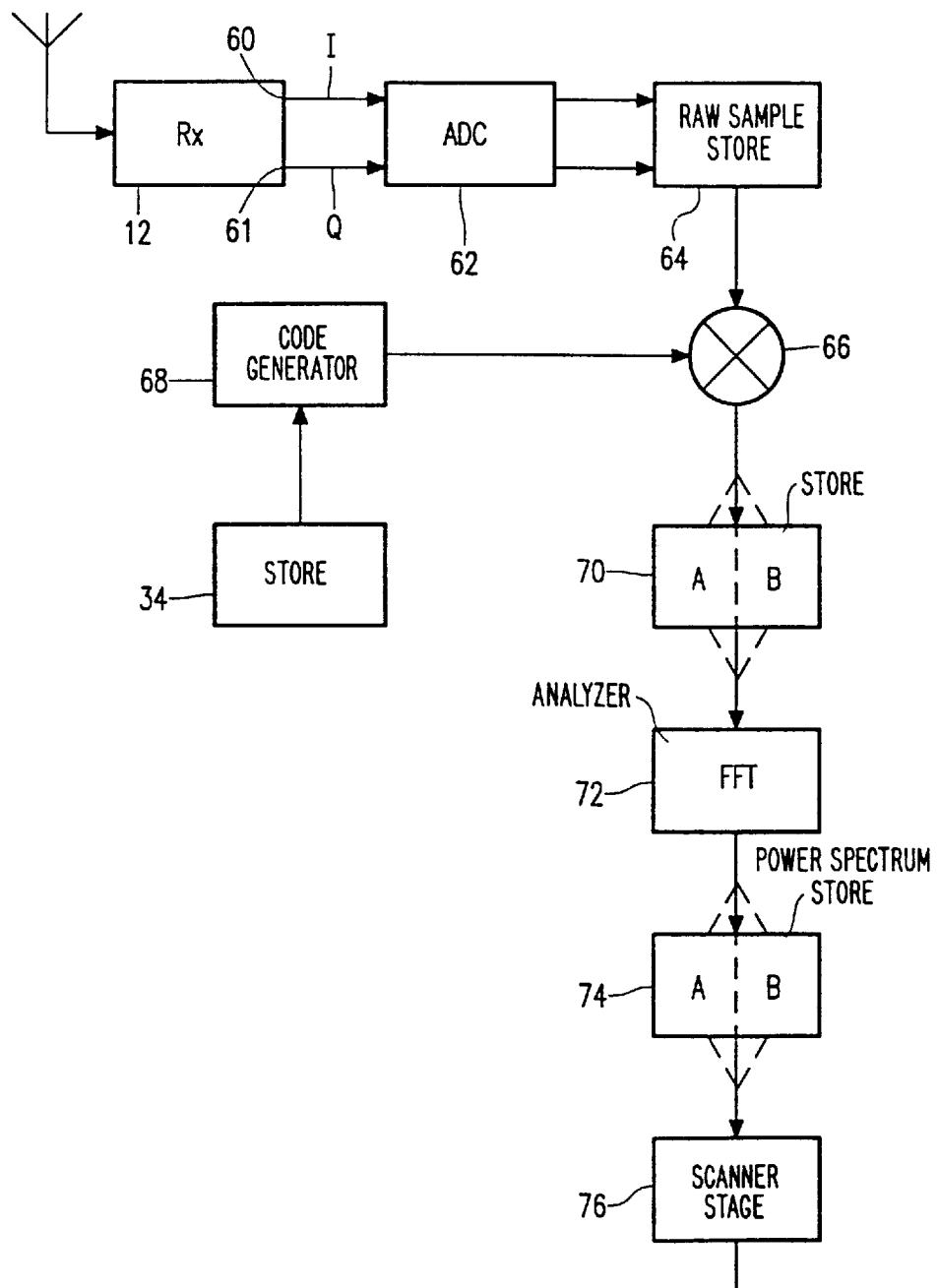
FIG. 5 is a block schematic diagram illustrating features of the primary station which enable frequency offsets and Doppler shifts to be allowed for, FIG. 6 is a diagram illustrating a despread signal plotted against time, t.

In accordance with the present invention the effects of frequency offsets and Doppler shifts are taken into account by the system controller 10 (FIGS. 1 and 2) as will be described with reference to FIGS. 5 to 8. Referring to FIG. 5, the spread spectrum signals are received by the receiver section of the transceiver 12 which provides quadrature related frequency down-converted I and Q signals on its outputs 60,61. The I and Q signals are digitised in an analogue to digital converter 62 which provides digitised versions of the raw data which are stored in a raw sample store 64. The raw samples are then read out to a multiplier 66 to which a code generator 68 is connected. The store 34 (FIG. 2) supplies details of code sequences to the generator 68 which produces a succession of code sequences, each of which is multiplied with the raw sample to produce a sequence of despread signals, for example as shown in FIG. 6, in which the offset frequency is present in the noise. Each of the despread samples is held in a store 70.

In order to take into account the possible presence of an offset frequency, each despread sample is frequency analysed in an analyser 72 such as a Fourier or FFT analyser. The results of the frequency analysis are stored in a power spectrum store 74. In a stage 76 each power spectrum is scanned for the presence of a peak which exceeds a threshold and causes an output to be produced indicating the presence or absence of a code.

In the case of a code being present this is indicated to the processor 26 which from the code identified deduces the meaning of the response signal.

Figure 7:
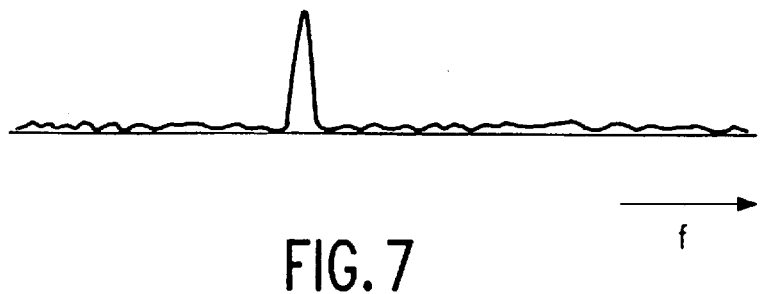
FIG. 7 illustrates a power spectrum of a clean signal plotted against frequency f.
Figure 8:
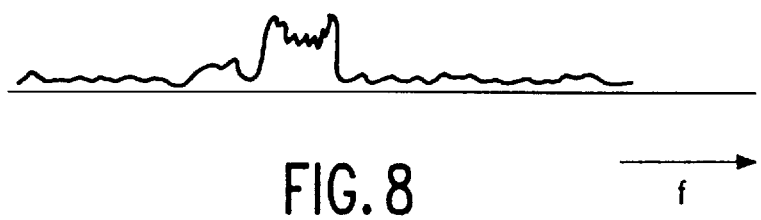
FIG. 8 illustrates a power spectrum of a signal having Doppler spread plotted against frequency f.

FIG. 7 illustrates a power spectrum for what may be regarded as a clean signal in that it has a clearly defined peak. In contrast FIG. 8 illustrates a power spectrum for a signal which includes a Doppler spread causing the peak to be of a lower amplitude and less well defined.

In the event of a large number of signals being present then, in order to reduce the search time, the despread sample store 70 and the spectrum store 74 (FIG. 5) each comprise at least two parts A,B and data is multiplexed so that whilst data is being written into, say, part A of the despread sample store 70, data is being read out of the other part B, and vice versa as indicated in the broken lines. The same applies to the spectrum store 74.

Although FIG. 5 illustrates the despreading and frequency analysis being done in separate stages, the entire operation can be done in a suitably programmed digital signal processor.

Figure 9:
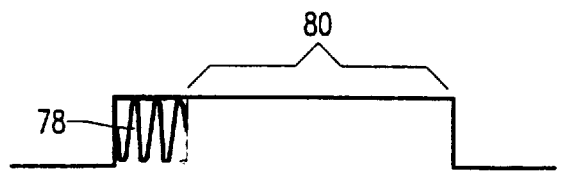
FIG. 9 illustrates a variant of the invention in which a secondary station transmits a frequency burst immediately preceding the spread spectrum signal.

In a variant of the method in accordance with the present invention, shown in FIG. 9, the initial part 78, say 0.2 seconds, of the transmission from a secondary station comprises unmodulated carrier (an unspread part) to which a second part 80 comprising the spread spectrum signal is concatenated.

Figure 10:
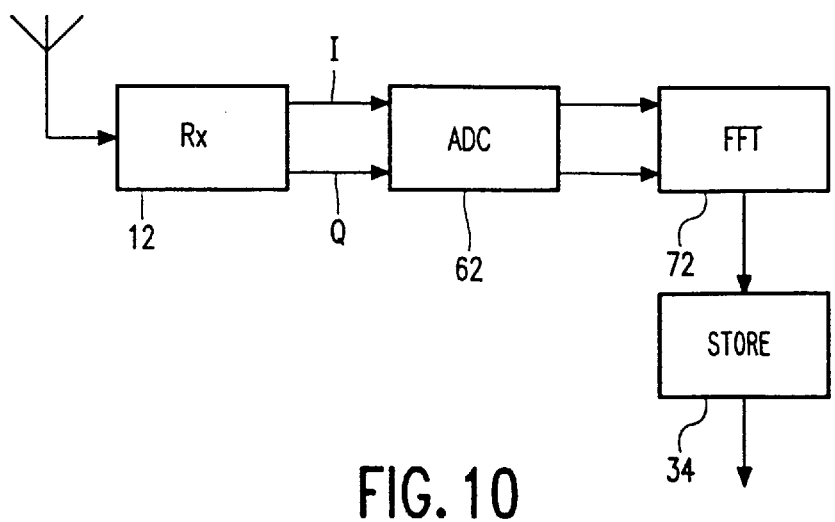
FIG. 10 is a block schematic diagram of those features of the primary station which enable the signal having the format shown in FIG. 9 to be recovered.

FIG. 10 illustrates the relevant part of the system controller in which the quadrature related components I,Q of the signal recovered from the receiver 12 are digitised in the ADC 62 and the digitised signal samples undergo frequency analysis in a Fourier analysis stage 72 to determine the offsets of any signals present. These offsets are applied to the store 34 in turn in order to recover the corresponding code details which are supplied to the controller (not shown) in order to determine the signal associated with the recovered code.

From reading the present disclosure, other modifications will be apparent to persons skilled in the art. Such modifications may involve other features which are already known in the design, manufacture and use of communications systems and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A communications system comprising a primary station having transmitting and receiving means, means for formatting messages to be transmitted by the transmitting means, and at least one secondary station, each of said at least one secondary station having receiving means for receiving messages from the primary station and means for transmitting predefined messages in the form of spread spectrum signals, each of the spread spectrum signals being produced using a spreading code, the spreading code being indicative of a predefined message, said receiving means in the primary station being adapted to receive and decode the spread spectrum signals, wherein said primary station includes means for frequency analyzing either an unspread part of the signal as received or the spread spectrum signal after despreading, means responsive to an output of the means for frequency analyzing for producing a frequency spectrum and means for scanning said frequency spectrum for peaks that exceed a predefined threshold, whereby detection of a peak indicates the presence of a predefined message, each said detection being correlated with the spreading code used to produce the spread spectrum signal having the detected peak, the correlated spreading code identifying the transmitted predefined message, and wherein the receiving means in the primary station comprises means for producing quadrature related frequency down converted signals, the primary station further including analog-to-digital conversion means responsive to the quadrature related frequency down converted signals for producing digitized raw samples of the digitized signals, first storage means for storing said digitized raw samples, code generating means, signal multiplying means having inputs coupled respectively to said first storage means and to the code generating means and an output for despread signal samples, means for frequency analyzing each of the despread signal samples and for producing said frequency spectrum as an output, and means for providing as an output an indication of the presence or absence of a code.

2. A communications system as claimed in claim 1, wherein second and third storage means are provided for respectively storing said despread samples and frequency spectrums, in that the second and third storage means each comprise at least two parts.

3. A communications system as claimed in claim 2, wherein each secondary station has means for generating an unmodulated carrier, and the transmitting means in the secondary station is controlled to transmit a pulse of energy constituted by the unmodulated carrier concatenated with the spread spectrum signal.

4. A communications system as claimed in claim 3, wherein the receiving means in the primary station comprises means for producing quadrature related frequency down converted signals and in that the primary station further comprises analogue-to-digital conversion(ADC) means for producing samples of digitized version of the quadrature related frequency down converted signals, frequency analysis means coupled to the ADC means for determining the presence of a frequency offset and means responsive to the determination of the frequency offset for seeking spread spectrum codes at these frequencies.

5. A primary station for use in a communication system, said primary station comprising means for formatting messages and transmitting said formatted messages, means for receiving and decoding spread spectrum signals which are transmitted to said primary station from a secondary station, each of the spread spectrum signals being produced using a spreading code, each different spreading code corresponding to a different predefined message, means for frequency analyzing either an unspread part of received signals or the received spread spectrum signals after despreading, means responsive to an output of the means for frequency analyzing for producing a frequency spectrum and means for scanning said frequency spectrum for peaks that exceed a predefined threshold, whereby detection of a peak indicates detection of a spread spectrum signal, the spreading code used to produce the spread spectrum signal that produced the detected peak identifying the predefined message carried by the detected spread spectrum signal, and wherein the receiving means comprises means for producing quadrature related frequency down converted signals and in that there is provided analogue-to-digital conversion means responsive to the quadrature related frequency down converted signals for producing digitized raw samples of the digitized signals, first storage means for storing said digitized raw samples, code generating means, signal multiplying means having inputs coupled respectively to said first storage means and to the code generating means and an output for despread signal samples, means for frequency analyzing each of the despread signal samples and for producing a frequency spectrum in response to the frequency analyzing means as an output, and means responsive to the frequency spectrum for providing as an output an indication of the presence or absence of a code.

6. A primary station, for use in a communications system, said primary station comprising means for formatting messages and transmitting said formatted messages, means for receiving and decoding spread spectrum signals which are transmitted to said primary station from a secondary station, each of the spread spectrum signals being produced using a spreading code, each different spreading code corresponding to a different predefined message, means for frequency analyzing either an unspread part of received signals or the received spread spectrum signals after despreading, means responsive to an output of the means for frequency analyzing for producing a frequency spectrum and means for scanning said frequency spectrum for peaks that exceed a predefined threshold, whereby detection of a peak indicates detection of a spread spectrum signal, the spreading code used to produce the spread spectrum signal that produced the detected peak identifying the predefined message carried by the detected spread spectrum signal, said communication system having at least one secondary station having means for generating unmodulated carrier and transmitting means controlled to transmit a pulse of energy constituted by unmodulated carrier concatenated with the spread spectrum signal, wherein the receiving means in the primary station comprises means for producing quadrature related frequency down converted signals, analog-to-digital conversion (ADC) means for producing samples of digitized version of the quadrature related frequency down converted signals, frequency analysis means coupled to the ADC means for determining the presence of a frequency offset and means responsive to the determination of the frequency offset for seeking spread spectrum codes at these frequencies.

7. A method of distinguishing between each of a plurality of substantially simultaneously occurring different spread spectrum signals which may include frequency offsets, comprising the steps of frequency analyzing either an unspread part of the signal as received or the spread spectrum signal after despreading, producing a frequency spectrum, scanning the frequency spectrum for peaks that exceed a predefined threshold and based thereon, indicating the presence or absence of a code, said method further including the steps of producing quadrature related frequency down converted versions of the received signals, producing digitized raw samples of the versions of the received signals, storing said digitized raw samples, despreading the digitized raw samples and frequency analyzing each of the despread signal samples and producing a frequency spectrum as an output.

* * * * *